United States Patent
Moldenhauer

(10) Patent No.: US 11,572,190 B2
(45) Date of Patent: Feb. 7, 2023

(54) METHOD FOR PROPELLING AN AIRCRAFT, PROPULSION SYSTEM, AND AIRCRAFT

(71) Applicant: Rolls-Royce Deutschland Ltd & Co KG, Blankenfelde-Mahlow (DE)

(72) Inventor: Stefan Moldenhauer, Ilmenau (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 176 days.

(21) Appl. No.: 16/651,533

(22) PCT Filed: Sep. 27, 2018

(86) PCT No.: PCT/EP2018/076243
§ 371 (c)(1),
(2) Date: Mar. 27, 2020

(87) PCT Pub. No.: WO2019/063682
PCT Pub. Date: Apr. 4, 2019

(65) Prior Publication Data
US 2020/0262573 A1    Aug. 20, 2020

(30) Foreign Application Priority Data
Sep. 29, 2017  (DE) .......................... 102017217425.0

(51) Int. Cl.
*B64D 33/08*  (2006.01)
*B64D 27/10*  (2006.01)
(Continued)

(52) U.S. Cl.
CPC ............. *B64D 33/08* (2013.01); *B64D 27/10* (2013.01); *B64D 27/24* (2013.01); *B64D 37/30* (2013.01);
(Continued)

(58) Field of Classification Search
CPC ........ B64D 33/08; B64D 37/30; B64D 37/34; F02C 7/224; F02C 7/36
See application file for complete search history.

(56) References Cited

U.S. PATENT DOCUMENTS 8,461,704 B2 * 6/2013 McLoughlin ........... F01D 15/10
                                                       290/46
9,878,796 B2 * 1/2018 Sheridan ................ B64D 35/02
(Continued)

FOREIGN PATENT DOCUMENTS

DE    102012207574 A1    11/2013
EP      2644508 B1      3/2015
GB      2548123 A  *    9/2017

OTHER PUBLICATIONS

US Energy Information Administration "Liquefied Natural Gas" (Year: 1900).*
(Continued)

*Primary Examiner* — Todd E Manahan
*Assistant Examiner* — Thuyhang N Nguyen
(74) *Attorney, Agent, or Firm* — Lempia Summerfield Katz LLC

(57) ABSTRACT

In the method for propelling an aircraft, to obtain electric energy, a fuel is combusted, and an electric machine is used, wherein the fuel is used to cool at least one part of the electric machine and contains natural gas. The propulsion system is configured to propel an aircraft, in particular according to the above-mentioned method. The propulsion system has an electric machine configured to obtain electric energy by combusting a fuel. The propulsion system further includes a natural gas tank configured to supply the fuel formed with natural gas, and a cooling device configured to cool at least one part of the electric machine. The aircraft has such a propulsion system.

15 Claims, 2 Drawing Sheets

10 Propulsion system
90 Natural gas
100 Natural gas tank
120 Combustion engine
160 Stator
170 Coolant circuit
180 Pump
185 Coolant line
190 Evaporator
195 Natural gas delivery line

(51) Int. Cl.
  *B64D 27/24*  (2006.01)
  *B64D 37/30*  (2006.01)
  *B64D 37/34*  (2006.01)
  *B64D 27/02*  (2006.01)

(52) U.S. Cl.
  CPC ........ *B64D 37/34* (2013.01); *B64D 2027/026* (2013.01)

(56) References Cited

U.S. PATENT DOCUMENTS

| | | | |
|---|---|---|---|
| 2012/0317996 A1* | 12/2012 | Lee | B63B 35/44 62/53.2 |
| 2013/0255281 A1 | 10/2013 | Bray | |
| 2014/0174083 A1* | 6/2014 | Gerstler | F17C 9/04 60/671 |
| 2015/0330303 A1* | 11/2015 | Delgado, Jr. | F02C 3/22 60/785 |

OTHER PUBLICATIONS

International Search Report and Written Opinion for International Patent Application PCT/EP2018/076243 dated Jan. 18, 2019.
German Office Action for German Patent Application No. 102017217425.0, dated Sep. 20, 2018.

* cited by examiner

10 Propulsion system
40 Rotor
50 Cooling system
60 Cold head
65 Propulsion capacity
70 Refrigeration machine
80 Waste heat
90 Natural gas
100 Natural gas tank 10 Propulsion system
90 Natural gas
100 Natural gas tank
120 Combustion engine
160 Stator
170 Coolant circuit
180 Pump
185 Coolant line
190 Evaporator
195 Natural gas delivery line 10 Propulsion system
20 Aircraft
30 Electric machine
40 Rotor
60 Cold head
70 Refrigeration machine
90 Natural gas
100 Natural gas tank 110 Fuel line
120 Combustion engine
130 Shaft
140 Propeller
150 Electric lines
160 Stator
170 Coolant circuit

ND FOR PROPELLING AN
AIRCRAFT, PROPULSION SYSTEM, AND
AIRCRAFT

The present patent document is a § 371 nationalization of PCT Application Serial No. PCT/EP2018/076243, filed Sep. 27, 2018, designating the United States, which is hereby incorporated by reference, and this patent document also claims the benefit of German Patent Application No. 10 2017 217 425.0, filed Sep. 29, 2017, which is also hereby incorporated by reference.

TECHNICAL FIELD

The disclosure relates to a method for propelling an aircraft, a propulsion system for propelling an aircraft, and an aircraft.

BACKGROUND

Serial hybrid-electric aircraft propulsion systems require electric machines with a particularly low power-to-weight ratio. To minimize the power-to-weight ratio, it is known to form a rotor of the electric machine from a superconductive material and to operate it at a temperature of 20 K.

To cool the rotor to 20 K, it is known to use cooling devices with refrigeration machines, which cool down the rotor from ambient temperature to 20 K.

However, such cooling devices have a high mass, which consequently disadvantageously increases the mass of the aircraft propulsion system and therefore the aircraft.

SUMMARY AND DESCRIPTION

Against this background of the prior art, it is therefore the object of the disclosure to provide an improved method for propelling an aircraft and an improved propulsion system, by which the cooling of part of an electric machine of an aircraft may be realized in an improved manner. In particular, the aim according to the disclosure is to enable cooling with a lower weight of the propulsion system. It is furthermore an object of the disclosure to provide an improved aircraft.

This object of the disclosure is achieved by a method, by a propulsion system, and by an aircraft disclosed herein.

In the method for propelling an aircraft, to obtain electric energy, a fuel is combusted, and an electric machine is used. In the method, the fuel is used to cool at least one part of the electric machine and the fuel contains natural gas.

In the method, the fuel, before it is combusted, may be supplied in liquid form.

Therefore, fuel including, e.g., liquid natural gas is used as the fuel instead of merely kerosene. In the present case, the natural gas is used, on the one hand, as a fuel, (i.e. as a chemical energy store), and, on the other, as a refrigerating energy store.

Cooling of the at least one part of the machine advantageously takes place by natural gas, in particular liquid natural gas. Natural gas may be liquefied at a temperature of 109 K to 112 K, e.g., ca. 110 K. Consequently, with liquid natural gas, the at least one part of the machine may be cooled to very low temperatures, in particular also to temperatures below 110 K, expediently to temperatures of no more than 50 K, e.g., of no more than 25 K.

In the method, thermal energy may be pumped from the at least one part into the fuel.

In an advantageous further development of the method, the fuel is used as a reservoir for a refrigeration machine.

In the above-mentioned further developments, a cooling machine is expediently used, which does not have to bridge the temperature difference between the temperature of the at least one part and the ambient temperature of approximately 300 K. Instead, a considerably lighter refrigeration machine may be used, which only has to bridge the smaller temperature difference between the temperature of the at least one part and the temperature of liquid natural gas of ca. 110 K, e.g., it only has to pump heat from the at least one part of the electric machine into the cold fuel at ca. 110 K. As a result of the considerably lighter refrigeration machine which may be used, the propulsion system of the aircraft, and consequently the aircraft as a whole, may be designed with a considerably lower power-to-weight ratio than previously known.

The use of a fuel including liquid natural gas is furthermore advantageous in that it is more easily possible to store liquid natural gas on board aircraft and it is easier to provide sufficient availability thereof at the airport than would be possible with liquid hydrogen as the fuel, for instance. In particular, a liquid hydrogen infrastructure is not required; instead, it is possible to revert to supplying liquid natural gas in a conventional manner.

The natural gas may be tanked in liquid form and stored at ca. 110 K on board the aircraft to be propelled by the method. The natural gas is expediently combusted to drive an internal combustion engine, (e.g., a gas turbine or a piston machine), of the aircraft.

Advantageously, considerably less $CO_2$ is emitted during the combustion of natural gas than during the combustion of kerosene. In particular, during the combustion of natural gas for driving an internal combustion engine in the form of a gas turbine, approximately 30 percent less natural gas is emitted than for the combustion of kerosene as the fuel. Moreover, fewer pollutants, such as NOx, CO or unburned carbon, are emitted during the combustion of natural gas. For combustion of the natural gas, the natural gas is suitably converted from the liquid form into the gaseous phase and heated to a temperature suitable for the internal combustion engine. The necessary evaporating capacity for this is obtained at ca. 110 K. The natural gas may be overheated, e.g., the evaporated natural gas is heated so that the heating of the natural gas may be used to provide additional refrigerating capacity.

In the method, the at least one part may be cooled to a cryogenic temperature. Alternatively, or additionally, the part may be at least one component part of a generator, in particular a rotor and/or a stator.

In particular, in the method, a coolant which may be brought into thermal contact with the part is used, by which the part may be brought to a cryogenic temperature. The part used may be one which, at the cryogenic temperature, advantageously has a conductivity which is at least a factor of 3, (or at least an order of magnitude), greater than the conductivity at room temperature or at 0 degrees Celsius.

In particular, within the context of this application, a cryogenic part is understood to be a part which is configured for an operating temperature of no more than 80 K, no more than 30 K, or no more than 23 K. The cryogenic part may be formed with aluminum and/or copper, e.g., with materials which are not necessarily superconductive at a cryogenic temperature of 21 K, but have an electrical resistance three orders of magnitudes lower. The part may be superconductive at cryogenic temperature. In a particularly further development, the cryogenic part is a component part of a generator, in particular at least one component part of a rotor of the generator. In particular, a cryogenic temperature is understood to be a temperature of no more than 80 K, no more than 30 K, or no more than 23 K.

The at least one part may be part of a rotor of the electric machine. It is the use of a rotor formed with superconductive material and the operation of at least one part of the rotor at a temperature of 20 K which enables the realization of propulsion systems with a particularly low power-to-weight ratio.

In the method, the at least one part may be cooled by a cooling device with a heat exchanger, wherein the heat exchanger is cooled with the fuel. The heat exchanger is expediently an evaporator.

In known propulsion systems of aircraft, parts of electric machines, in particular the stator of the electric machine, are sometimes cooled with a coolant above room temperature. In this case, the coolant is cooled with ambient air via a coolant/air heat exchanger. Owing to the possibly high air temperature of greater than 50° C. when the aircraft is started, the coolant/air heat exchanger has to be sufficiently dimensioned to provide adequate cooling of the part in this case.

On the other hand, as a result of the temperature of the liquid natural gas, which is considerably lower than the ambient temperature, the part, in particular of the stator, may be cooled by a cooling device which is considerably lighter than previously known. In particular, an evaporation heat of the natural gas is expediently used during the transition from the liquid to the gaseous state. Such a cooling device may therefore be designed to be considerably smaller and lighter than previously known. Furthermore, heating of the evaporated natural gas, e.g., overheating of the natural gas, may also be used to provide a cooling capacity.

In particular, additional cooling capacity for the at least one part may be provided directly by the evaporation of the liquid natural gas located on board.

The high driving temperature difference between liquid natural gas and coolant enables the use of a considerably smaller cooler for the coolant and therefore a reduction in the mass of the coolant cooler. Moreover, by lowering the operating temperature of the at least one part, for instance a part of the stator, the efficiency thereof may be increased and its mass may be further reduced.

In the method, the fuel is supplied at a temperature of less than 150 K or at no more than 120 K. In this further development, the fuel with the natural gas may be supplied in liquid form.

The propulsion system is a propulsion system for propelling an aircraft, in particular according to the method as described above. The propulsion system has an electric machine to obtain electric energy by combustion of a fuel, wherein a natural gas tank is provided, which is designed to supply the fuel formed with natural gas and which is part of a cooling device which is designed to cool at least one part of the electric machine.

In the propulsion system, the at least one part of the machine may be configured for operation at cryogenic temperature and in particular for superconductive operation. The part is expediently a cryogenic part, as explained above with reference to the method.

To firstly obtain mechanical energy by combustion of the fuel, the propulsion system may include an internal combustion engine mechanically coupled to the electric machine, wherein the electric machine is designed to convert the mechanical energy into electric energy. The internal combustion engine may be a gas turbine or a piston machine.

The internal combustion engine operated with natural gas advantageously has a considerably lower $CO_2$ emission than an internal combustion engine operated with kerosene. In particular, in the case of an internal combustion engine in the form of a gas turbine, the $CO_2$ emission in the case of natural gas as the fuel is approximately 30 percent lower than in the case of kerosene as the fuel. Furthermore, natural gas as a fuel combusts more cleanly, e.g., fewer pollutants such as, in particular, NOx, CO, or unburned carbon are emitted.

In an advantageous further development, the propulsion system has a refrigeration machine, which is connected to the natural gas tank and the at least one part of the electric machine. The refrigeration machine is designed to pump heat from the part into the fuel.

In the propulsion system, the cooling device suitably includes a heat exchanger, in particular an evaporator, wherein the heat exchanger is designed and arranged to transfer heat to/into the fuel.

The aircraft is, in particular, a serial hybrid-electric aircraft and has a propulsion system as described above. The propulsion system of the aircraft and therefore the aircraft itself may be designed with a low power-to-weight ratio.

BRIEF DESCRIPTION OF THE DRAWINGS

The disclosure is explained in more detail below with the aid of an exemplary embodiment illustrated in the drawings.

DETAILED DESCRIPTION

Figure 1:
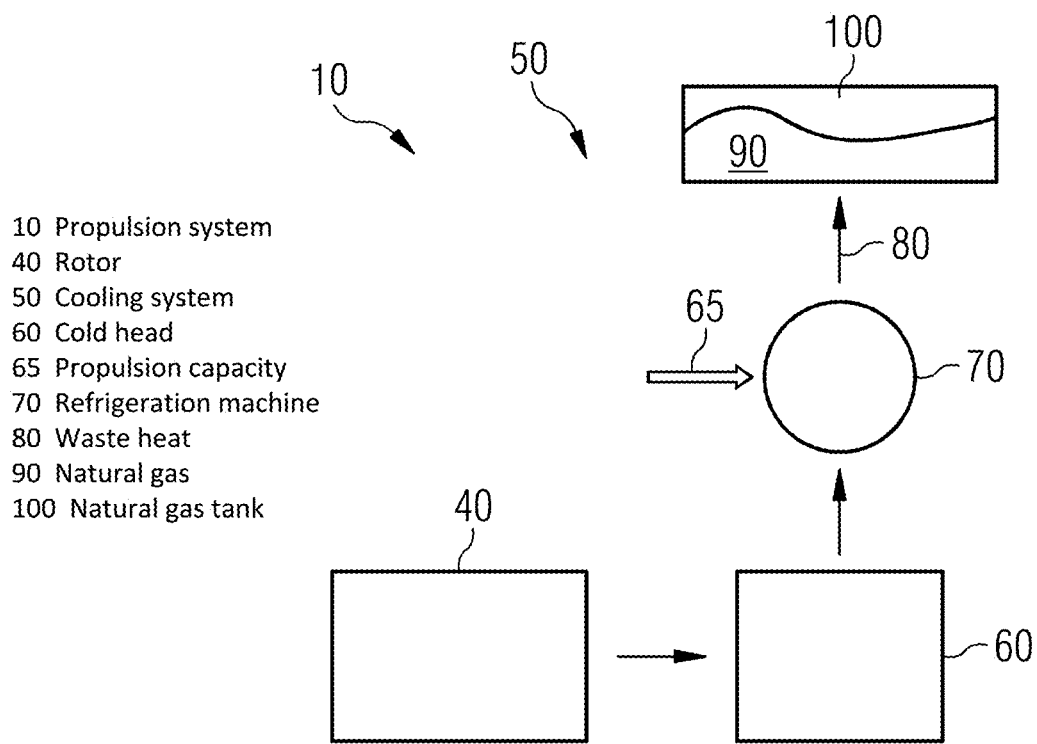
FIG. 1 depicts a first exemplary embodiment of a propulsion system of an aircraft for executing a method for propelling the aircraft in a schematic diagram.
Figure 3:
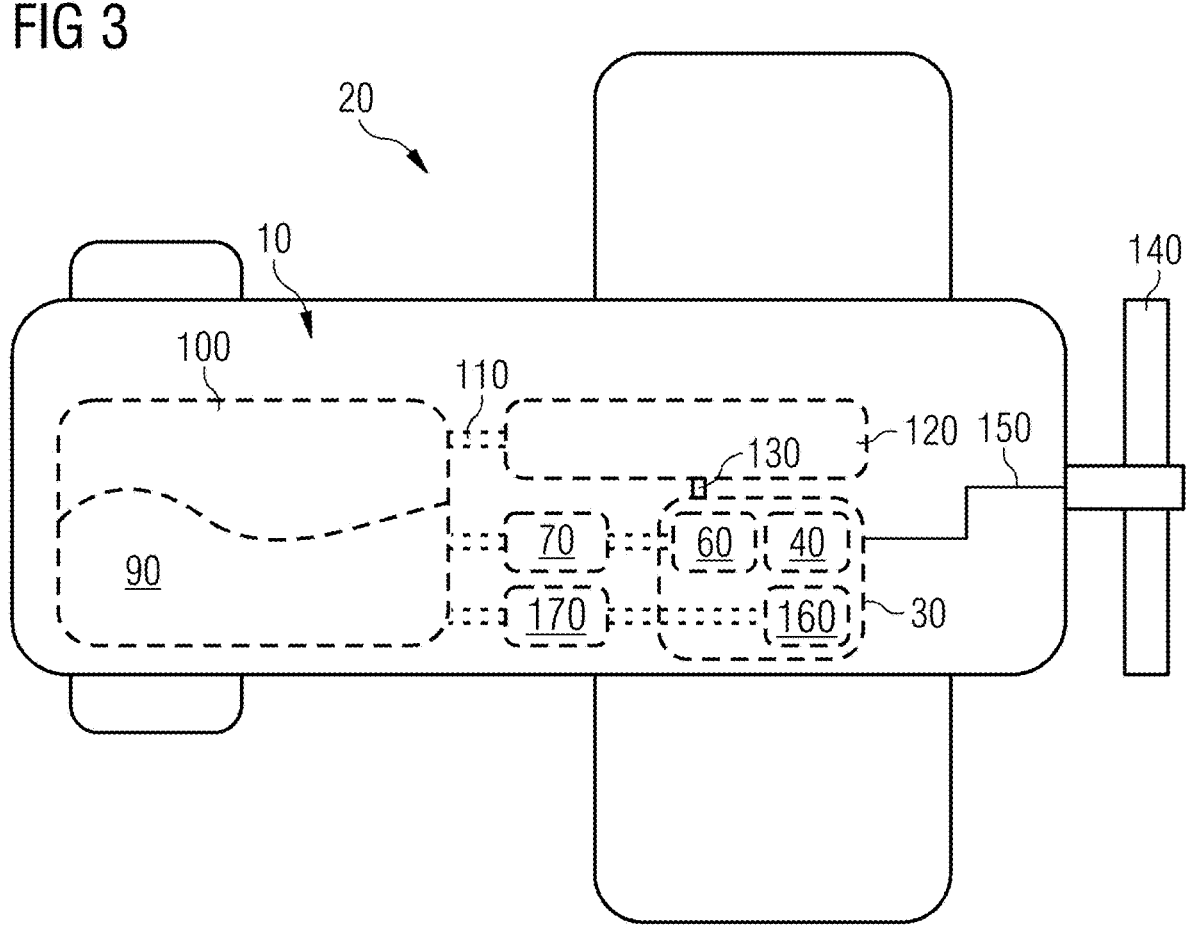
FIG. 3 depicts an example of an aircraft with a propulsion system according to FIGS. 1 and 2.

The propulsion system 10 illustrated in FIG. 1 is a serial hybrid propulsion system of an electric aircraft 20 (see also FIG. 3).

The propulsion system 10 has an electric machine 30, which, to realize as low a power-to-weight ratio as possible, has a cryogenic part, in the illustrated exemplary embodiment one with a rotor 40 formed with a superconductive material. The superconductive rotor 40 is designed to operate below the transition temperature of the superconductive material, in this case to operate at 20 K.

The propulsion system has a cooling system 50 to cool the rotor 40 of the propulsion system 10. The cooling system 50 includes a cold head 60, which abuts against the rotor 40 and transmits heat from the rotor 40 as a result of the thermal contact between the cold head 60 and the rotor 40.

A propulsion capacity 65 of the propulsion system 10 is used to operate a refrigeration machine 70 of the cooling system. The refrigeration machine 70 uses the propulsion capacity 65 of the propulsion system 10 and pumps heat from the cold head 60 as waste heat 80 into a heat bath. The heat bath is formed by a liquid natural gas 90, which represents a fuel of the propulsion system 10 and is held in a fuel tank in the form of a natural gas tank 100. The refrigeration machine 70 therefore pumps heat into the natural gas tank 100 and heats the natural gas 90 located in the natural gas tank 100.

The natural gas (not illustrated explicitly) evaporated as result of the heating of the natural gas tank 100 is conducted by a fuel line 110 to an internal combustion engine 120 of the propulsion system 10 of the aircraft 20. The internal combustion engine 120 is designed to combust the evaporated natural gas and to convert the released combustion energy into mechanical energy. The evaporated natural gas therefore forms the fuel of the internal combustion engine 120. The internal combustion engine 120 is mechanically coupled by a shaft 130 to the electric machine 30, which is designed and arranged to convert the mechanical energy into electric energy. To supply electric consumers, for instance a propeller 140 and an on-board power supply system of the aircraft 20, the electric machine 30 is electrically connected thereto via electric lines 150.

Figure 2:
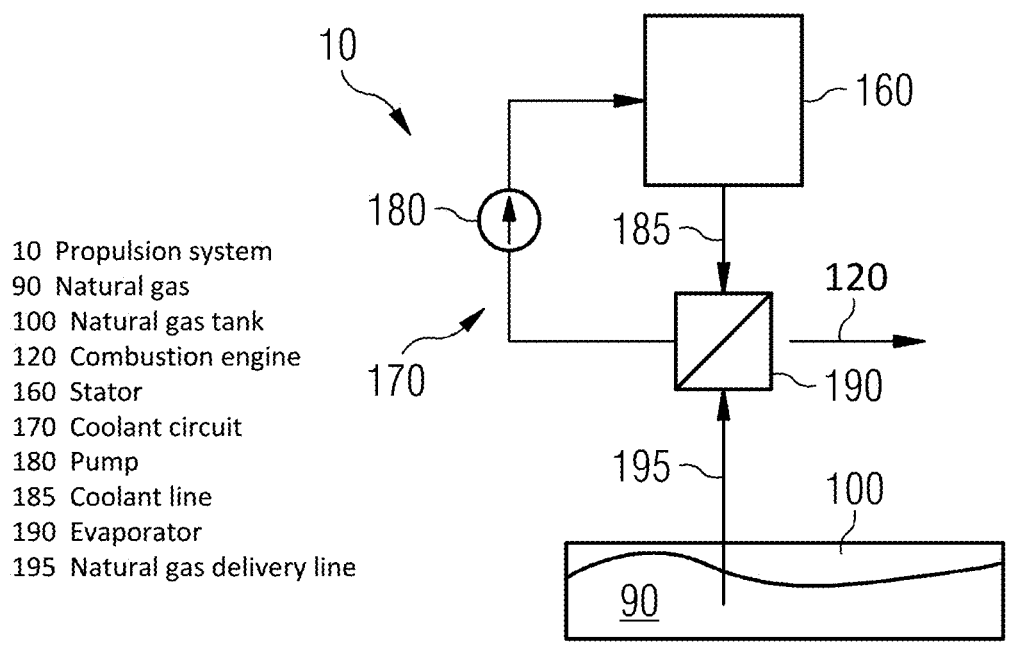
FIG. 2 depicts a second, likewise implemented exemplary embodiment of a propulsion system of an aircraft for executing a further likewise implemented method for propelling the aircraft in a schematic diagram.

As illustrated in FIG. 2, the liquid natural gas 90 of the natural gas tank 100 is moreover used to cool a stator 160 of the electric machine 30.

To this end, the electric machine 30 has a coolant circuit 170, which is designed for a coolant to flow along the stator 160 and to be cooled as a result of the thermal contact. To this end, the coolant circuit 170, in a manner known per se, has a pump 180 which is designed and arranged to pump the coolant, here a cooling fluid, through the coolant circuit 170. The coolant is heated by the stator 160 during the operation of the propulsion system 10 and subsequently conducted via a coolant line 185 to a heat exchanger in the form of an evaporator 190. By the evaporator 190, the heat of the coolant which is absorbed at the stator 160 may be transferred to a portion of the liquid natural gas 90, which is guided to the evaporator 190 via a natural gas delivery line 195. The liquid natural gas may consequently evaporate and therefore extract heat from the coolant. The evaporated natural gas may additionally be overheated at the evaporator 190 so that, owing to the overheating of the evaporated natural gas, additional refrigerating capacity is additionally introduced into the coolant circuit 170.

In the aircraft 20, both exemplary embodiments of the propulsion system 10 which are illustrated in FIGS. 1 and 2 are likewise implemented. Alternatively, in further exemplary embodiments of the aircraft 20, which moreover correspond to the illustrated exemplary embodiments, it is possible for only one of the two exemplary embodiments of the propulsion system 10 which are illustrated in FIGS. 1 and 2 to be implemented in each case.

The method for propelling the aircraft 20 is carried out as described above, e.g., the above-described propulsion system 10 of the aircraft 20 is used as designated.

The evaporated natural gas is subsequently supplied to the internal combustion engine 120 as fuel (not shown explicitly in FIG. 3).

The invention claimed is:

1. A method for propelling an aircraft, the method comprising:
    cooling at least one part of an electric machine with a coolant, wherein the coolant is supplied to the at least one part of the electric machine at a cryogenic temperature of less than 80 K, and wherein the coolant is heated in the cooling of the at least one part of the electric machine;
    transferring the coolant to a heat exchanger;
    cooling the coolant to the cryogenic temperature using the heat exchanger via a heat exchange with a fuel, wherein at least a portion of the fuel is evaporated, and wherein the coolant is cycled via a coolant circuit back to the at least one part of the electric machine;
    transferring the evaporated fuel to an internal combustion engine;
    combusting the evaporated fuel to convert combusted energy into mechanical energy;
    converting, by the electric machine coupled to the internal combustion engine, the mechanical energy into electrical energy; and
    propelling the aircraft using the electric energy.

2. The method of claim 1, wherein the at least one part of the electric machine is cooled to a temperature less than 80 K, and/or
    wherein the at least one part of the electric machine is a component part of a generator, a rotor, a stator, or a combination thereof.

3. The method of claim 1, wherein the cryogenic temperature is no more than 30 K.

4. The method of claim 1, wherein the fuel comprises liquified natural gas.

5. The method of claim 1, wherein the fuel comprises liquified hydrogen.

6. A propulsion system for propelling an aircraft, the propulsion system comprising:
    an electric machine configured to obtain electric energy by combustion of a fuel;
    a fuel tank configured to supply the fuel;
    a cooling device in communication with the fuel tank, wherein the cooling device is configured to cool at least one part of the electric machine with a coolant supplied to the at least one part of the electric machine at a cryogenic temperature of less than 80 K, and wherein the coolant is configured to be heated in the cooling of the at least one part of the electric machine;
    a heat exchanger in communication with the cooling device, wherein the heat exchanger is configured to receive the coolant from the cooling device, wherein the coolant is configured to be cooled to the cryogenic temperature using the heat exchanger via a heat exchange with the fuel provided from the fuel tank, wherein at least a portion of the fuel is configured to be evaporated, and wherein the coolant is configured to be cycled via a coolant circuit back to the at least one part of the electric machine; and
    an internal combustion engine in communication with the heat exchanger, wherein the internal combustion engine is configured to receive the evaporated fuel and combust the evaporated fuel into mechanical energy,
    wherein the electric machine is mechanically coupled to the internal combustion engine, and
    wherein the electric machine is configured to convert the mechanical energy into electrical energy to propel the aircraft.

7. The propulsion system of claim 6, wherein the at least one part of the electric machine is configured to operate at the cryogenic temperature.

8. The propulsion system of claim 6, wherein the at least one part of the electric machine is configured for superconductive operation.

9. The propulsion system of claim 6, wherein the heat exchanger is an evaporator.

10. The propulsion system of claim 6, wherein the fuel comprises liquified natural gas.

11. The propulsion system of claim 6, wherein the fuel comprises liquified hydrogen.

12. An aircraft comprising:
    a propulsion system comprising:
        an electric machine configured to obtain electric energy by combustion of a fuel;
        a fuel tank configured to supply the fuel;

a cooling device in communication with the fuel tank, wherein the cooling device is configured to cool at least one part of the electric machine with a coolant supplied to the at least one part of the electric machine at a cryogenic temperature of less than 80 K, and wherein the coolant is configured to be heated in the cooling of the at least one part of the electric machine;

a heat exchanger in communication with the cooling device, wherein the heat exchanger is configured to receive the coolant from the cooling device, wherein the coolant is configured to be cooled to the cryogenic temperature using the heat exchanger via a heat exchange with the fuel provided from the fuel tank, wherein at least a portion of the fuel is configured to be evaporated, and wherein the coolant is configured to be cycled via a coolant circuit back to the at least one part of the electric machine; and an internal combustion engine in communication with the heat exchanger, wherein the internal combustion engine is configured to receive the evaporated fuel and combust the evaporated fuel into mechanical energy, wherein the electric machine is mechanically coupled to the internal combustion engine, and wherein the electric machine is configured to convert the mechanical energy into electrical energy to propel the aircraft.

13. The aircraft of claim 12, wherein the heat exchanger is an evaporator.

14. The aircraft of claim 12, wherein the fuel comprises liquified natural gas.

15. The aircraft of claim 12, wherein the fuel comprises liquified hydrogen.

* * * * *